United States Patent [19]

Gruczelak

[11] 4,339,777

[45] Jul. 13, 1982

[54] AIR-FLOW SYSTEM FOR A DISK FILE

[75] Inventor: Norman P. Gruczelak, Thousand Oaks, Calif.

[73] Assignee: Minnesota Mining and Manufacturing Company, St. Paul, Minn.

[21] Appl. No.: 139,021

[22] Filed: Apr. 10, 1980

[51] Int. Cl.³ .............................................. G11B 17/02
[52] U.S. Cl. ................................................... 360/97
[58] Field of Search ................................... 360/97–99, 360/132–133, 135, 86, 100

[56] References Cited

U.S. PATENT DOCUMENTS

| | | | |
|---|---|---|---|
| 3,624,624 | 11/1971 | Johnson | 360/100 |
| 3,710,357 | 1/1973 | Buslik | 360/106 |
| 3,723,980 | 3/1973 | Gabor | 360/98 |
| 3,800,325 | 3/1974 | O'Brien | 360/99 |
| 3,825,951 | 7/1974 | Katsumori et al. | 360/133 |
| 3,863,266 | 1/1975 | Hoshino | 360/99 |
| 4,054,931 | 10/1977 | Bolton et al. | 360/97 |
| 4,130,845 | 12/1978 | Kulma | 360/133 |
| 4,147,299 | 4/1979 | Freeman | 236/49 |
| 4,249,221 | 2/1981 | Cox et al. | 360/97 |
| 4,282,554 | 8/1981 | Ho et al. | 360/97 |
| 4,292,656 | 9/1981 | Fujioka | 360/97 |

FOREIGN PATENT DOCUMENTS 2024495  5/1978  United Kingdom .

Primary Examiner—Alfred H. Eddleman

[57] ABSTRACT

Disk file wherein the disk-drive spindle is journalled in a partition which separates a sealed housing into two compartments, the disk or disks are in one compartment and a blower also mounted on the spindle is in the other compartment.

9 Claims, 3 Drawing Figures

AIR-FLOW SYSTEM FOR A DISK FILE

BACKGROUND OF THE INVENTION

U.S. Pat. No. 4,054,931 (Bolton et al.) discloses a magnetic recording disk file consisting of a sealed housing in which one or more rigid magnetic recording disks are rotated at high speed. Recording heads, arranged adjacent to each recording face of the disks, initially rest on the disk surface but float upon a thin film of air when the disks rotate at operating speed. Because particulate matter trapped between the heads and the disks would damage the recording surfaces, the air within the housing must be exceedingly clean. In order to keep the air clean, an air impeller mounted on the free end of the disk spindle draws air downwardly through a main filter near the top of a housing. The filtered air flows outwardly and then upwardly to recirculate through the main filter. The rotation of the disks also forces air outwardly, thus supplementing the air flow to carry to the main filter particulate matter generated when the heads contact the rotating disks.

In the disk file of U.S. Pat. No. 4,147,299 (Freeman), recirculating air is channeled through an absolute filter, past a head-disk assembly and to an air-diverter valve which is thermostatically controlled to exhaust as much of the air as is necessary to maintain the temperature within a desired range. The recirculated portion of the air is returned to an intake plenum which also receives make-up air through an intake filter to replace the exhausted air.

The air-flow system of U.S. Pat. No. 4,147,299 should provide a far cleaner environment than does the system of U.S. Pat. No. 4,054,931, especially when operated with the air-diverter valve closed.

The Present Invention

The present invention provides an air-flow system for a disk file which is similar to that of U.S. Pat. No. 4,147,299 in that each system comprises a housing having a sealed chamber containing
(a) a blower,
(b) a channel containing a main filter which is an absolute filter in the sense that all recirculating air must pass through it,
(c) at least one rotating memory disk and associated transducers at the outlet of said channel,
(d) an intake or breather filter, and
(e) an intake plenum for the blower which receives both the recirculating air and make-up air from the intake or breather filter.

The system of the present invention differs from that of U.S. Pat. No. 4,147,299 in that
(1) a partition divides said chamber into two compartments,
(2) a drive spindle for both said blower and said disk is journalled in the partition, the blower being in one compartment and the disk or disks and associated transducers in the other, and
(3) the breather filter has a very high impedance relative to that of the main filter so that the pressures at all points within the disk compartment exceed atmospheric pressure and the pressure at the intake plenum remains slightly below the atmospheric pressure.

The chambers of prototype disk files embodying the present invention have been completely sealed except at the breather filter.

The novel arrangement provides a number of benefits.

First, it enables the disk file to be very compact. For example, a prototype 210-mm single-disk file and associated electronics fit into a space designed for a commercial 8-inch (20-cm) diskette drive. Because of the compactness, the recirculating air path is short, thus providing more effective cooling of relatively massive components such as motors.

Second, hardware complexity and costs are minimized by having only one spindle drive for both the disks and the blower.

Third, as in U.S. Pat. No. 4,147,299, at modest power input a high volume of air can be moved across the disk assembly and parts requiring cooling. Rapid air flow provides better cleaning, enhances heat-dissipation to external cooling fins or the like, and tends to keep all elements within the chamber at the same temperature.

The $I^2R$ losses of the spindle motor and head-positioning motor should be as low as possible. By sealing these motors within the chamber, elements within the chamber reach a stable temperature more rapidly than would be the case if heat from external motors were carried by conduction through the housing.

The impedance of the breather filter should be selected relative to that of the main filter such that the pressure in the disk compartment exceeds that of the intake plenum for the blower. Since air moving through the bearing in the partition may be contaminated, it is important for it to flow into the intake plenum and then to pass through the main filter before reaching the disk assembly. If there is a bearing in the outer wall of the blower compartment to an external motor, air emanating from the blower should sweep across the bearing to insure that any air leaking through that bearing flows outwardly.

THE DRAWING

Figure 1:
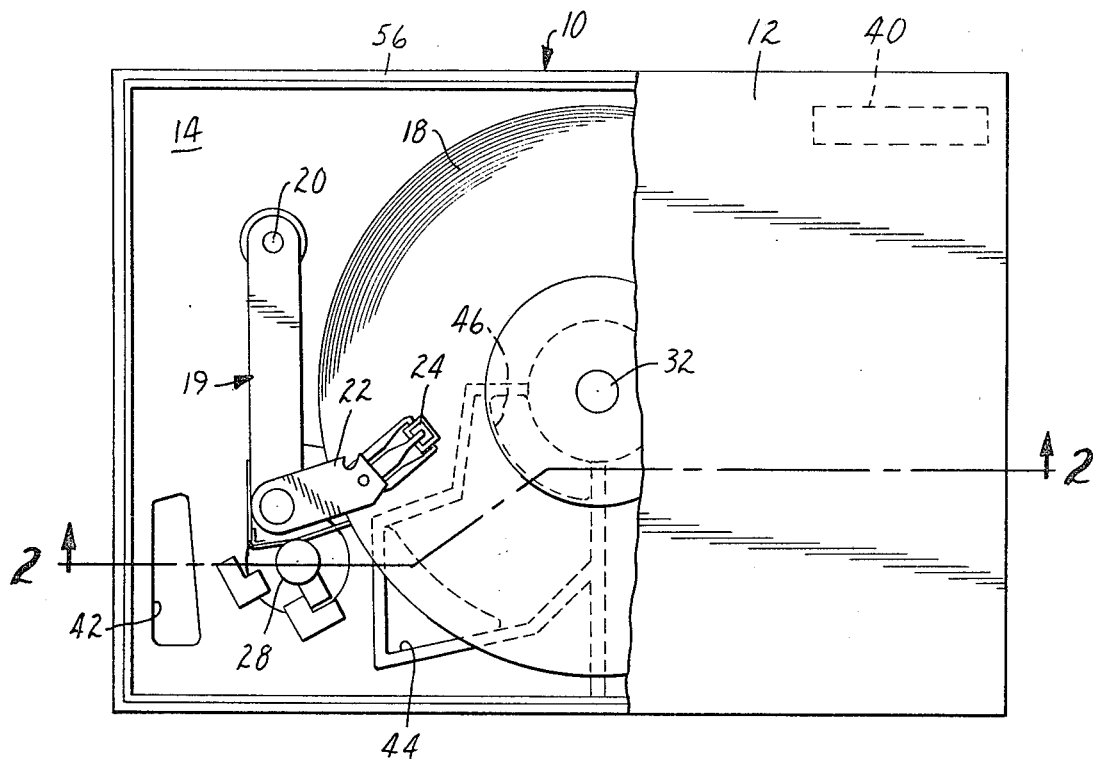
FIG. 1 is a top view of a single-disk file embodying the invention.
Figure 2:
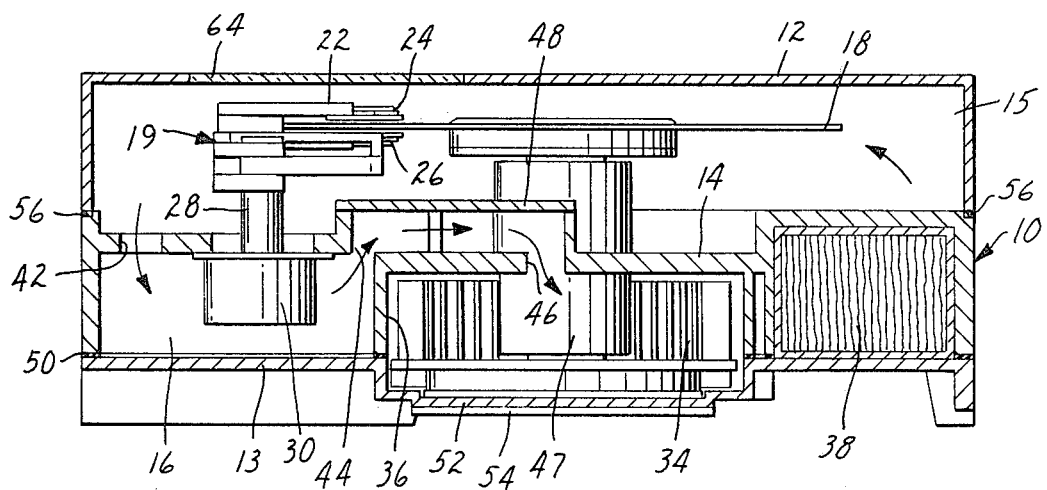
FIG. 2 is a section along lines 2—2 of FIG. 1.
Figure 3:
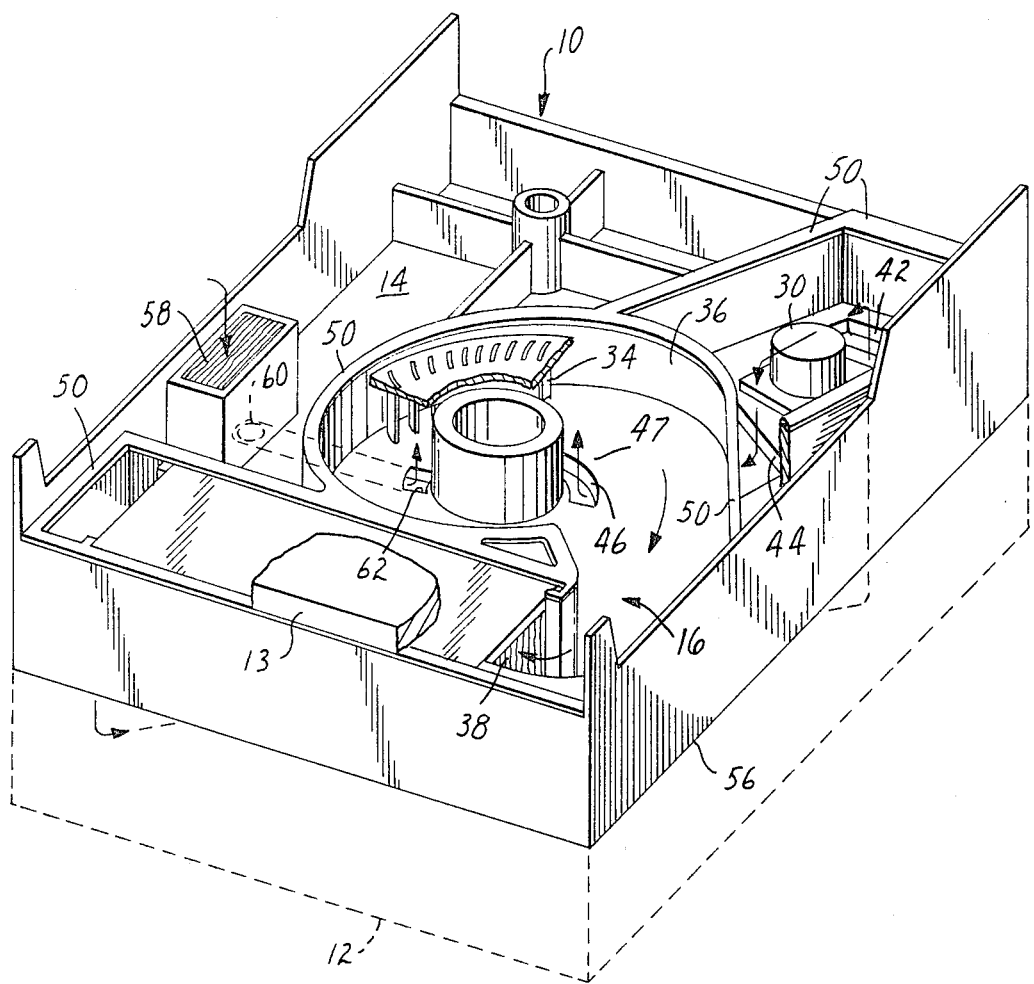
FIG. 3 is an isometric view from the underside of the disk file of FIGS. 1 and 2.

The disk file shown in the drawing comprises a 3-piece metal (aluminum) housing consisting of a central casting 10, a top cover 12 and a bottom cover 13 (a fragment of which is shown in FIG. 3). The central casting includes a horizontal partition 14 which with the top cover 12 creates an upper compartment 15 and with the bottom cover 13 creates a lower compartment 16. The upper compartment 15 extends substantially completely across the housing and contains a single rigid magnetic recording (memory) disk 18 and a conventional head-positioning mechanism 19 which pivots at 20 (FIG. 1). It has a bifurcated arm 22 for positioning one transducing head 24 at the top recording surface of the disk 18 and another transducing head 26 at its bottom recording surface. The heads float about 0.5 micrometer above the recording surfaces when the disk rotates at operating speed. The arm 22 is moved inwardly and outwardly by a slotted metal band (not shown) of the type shown in FIG. 2 of U.S. Pat. No. 4,170,146 which is wrapped around a pulley 28 that is driven by a stepper motor 30.

The disk 18 is mounted on a spindle 32 which is journalled in a bearing (not shown) in the partition 14. The spindle extends into the lower compartment 16 which contains a spindle-driving motor (not shown) and a squirrel-cage fan 34 which is mounted on the spindle. The central casting 10 is formed to surround the fan 34 with a spiral scroll 36 (FIG. 3) which is concentric with the spindle to provide a blower similar to that of U.S. Pat. No. 4,147,299. The scroll 36 opens into a passageway which is filled with a main filter 39 so that all recirculating air must pass through it.

Air emerging from the main filter 38 through an opening 40 in the partition 14 enters the broad upper compartment 15 and flows past the disk 18 and then past the head-positioning mechanism 19. At the corner furthest from the opening 40, another opening 42 in the partition 14 allows the recirculating air to re-enter the lower compartment 16 in order to cool the steppermotor 30. The air proceeds through a third opening 44 and a fourth opening 46 in the partition 14 and into the intake plenum 47 for the fan 34. A small plate 48 covers the cavity between the openings 44 and 46 so that the air recirculating through the opening 44 does not enter the upper compartment 15.

As seen in FIG. 3, the apexes of the vertical walls of the central casting 10 which duct the recirculating air create a narrow, continuous level surface which mates with a continuous, level peripheral surface of the bottom cover 13 around a gasket 50 in order to seal the lower compartment 16. These vertical walls also act as structural members.

A bell-shaped area 52 of the bottom cover 13 which is concentric with the spiral scroll 36 receives the spindle-driving motor, and the external surface of the bell-shaped area is formed with cooling fins, one of which 54 is shown in FIG. 2. The circular flow of air within the spiral scroll 36 produces a circular flow of air within the bell-shaped area 52 to enhance the transfer of heat from the motor to the cooling fins 54. The top cover 12 and the central casting 10 are sealed together by a second gasket 56 substantially at their peripheries.

The outer walls of the central casting which extend downwardly from the partition 13 partially enclose space outside the lower compartment 16. This space accommodates electronic components and also a breather filter 58, above which is a small opening 60 in the partition 14 of the central casting 10. Outside air flowing upwardly through the filter 58 and the opening 60 enters a small cavity above the partition 14 which is closed by a plate (not shown) to prevent the outside air from flowing directly into the upper compartment 15. The outside air then flows downwardly through a small opening 62 in the partition 14 to reach the intake plenum 47.

The breather filter 58 has a very high impedance relative to that of the main filter 38. Their impedances are selected so that the pressures at all points within the upper compartment 15 exceed the atmospheric pressure and the pressure at the intake plenum 47 remains slightly below the atmospheric pressure. The volume of outside air flowing through the breather filter 58 should be very low, only whatever is necessary to replace any leakage through the gaskets between the central casting 10 and its two covers 12 and 13. Hence, the breather filter should remain reasonably clean for a prolonged period of time.

A glass window 64 in the top cover 12 (FIG. 2) permits viewing of the head-positioning mechanism 19 and a portion of the disk 18.

A prototype disk file as shown in FIGS. 1–3 has been constructed to the following specifications:

| | |
|---|---|
| Disk 18 | 210 mm in diameter |
| Spindle motor | 24 watts in 3125 rpm |
| Air flow | 3 cfm (0.085 m$^3$/min.) |
| Recirculation rate | 28 air changes per min. |
| Air purity | less than 350 particles exceeding 0.5 $\mu$m per m$^3$ |
| Impedance of filter 38 | 10 cm of water/m$^3$ per min. |
| Impedance of filter 58 | 130 cm of water/m$^3$ per min. |
| Air pressure relative to atmospheric at | |
| opening 46 | −0.13 cm of water |
| inlet of filter 38 | 1.45 cm of water |
| outlet of filter 38 | 0.58 cm of water |
| center of disk 18 | 0.02 cm of water |
| periphery of disk 18 | 0.51 cm of water |

In this prototype approximately $\frac{2}{3}$ of the power of the spindle motor was used to drive the disk and $\frac{1}{3}$ was used to drive the fan.

I claim:

1. In an air-flow system for a disk file comprising a housing defining a chamber containing (a) a blower, (b) a channel containing a main filter through which all air from the blower must pass, (c) at least one rotating memory disk and associated transducer at the outlet of said channel, (d) a breather filter, and (e) an intake plenum for the blower which receives both recirculating air and outside air directly from the breather filter, the improvement comprising:
   (1) a partition divides said chamber into two compartments,
   (2) a drive spindle for both said blower and said disk is journalled into the partition, the blower being in one compartment and the disk and associated transducer in the other,
   (3) the breather filter has a very high impedance relative to that of the main filter so that the pressures at all points within the disk compartment exceed atmospheric pressure and the pressure at the intake plenum remains slightly below the atmospheric pressure, and
   (4) the chamber is sealed except for the breather filter.

2. In an air-flow system as defined in claim 1, the further improvement comprising:
   said housing consists essentially of a central casting including said partition plus top and bottom covers sealed to the central casting.

3. In an air-flow system as defined in claim 2, the further improvement comprising:
   said central casting includes a spiral scroll, said drive spindle is journalled on the axis of the scroll, and said blower is provided by a squirrel cage fan mounted within the scroll.

4. In an air-flow system as defined in claim 2, the further improvement comprising:
   said one compartment is a lower compartment defined by said central casting and bottom cover, and said blower and motor for driving the spindle are within said lower compartment.

5. In an air flow system as defined in claim 4, the further improvement comprising:
   the central casting has outer walls extending downwardly from said partition, thus partially enclosing space outside said lower compartment to accommodate said breather filter, and an opening in the partition adjacent the breather filter, and a second opening in the partition adjacent the intake plenum permit outside air from the breather filter to reach the intake plenum.

6. In an air-flow system as defined in claim 4, the further improvement comprising:

said bottom cover has a bell-shaped area concentric with said scroll for receiving said motor.

7. In an air-flow system as defined in claim 6, the further improvement comprising:

the external surface of said bell-shaped area has cooling fins.

8. In an air-flow system as defined in claim 7, the further improvement comprising:

the central casting has a series of flanges which together with its spiral scroll create an essentially continuous level surface, and the bottom cover has an essentially continuous level surface at its periphery which mates with said surface of the central casting to seal said lower compartment.

9. In an air-flow system as defined in claim 2, the further improvement comprising:

said top cover and said central casting are sealed together by a gasket substantially at their peripheries.

* * * * *